No. 883,292. PATENTED MAR. 31, 1908.
W. F. CARLTON.
PNEUMATIC GRAIN CONVEYER.
APPLICATION FILED SEPT. 6, 1907.
2 SHEETS—SHEET 1.
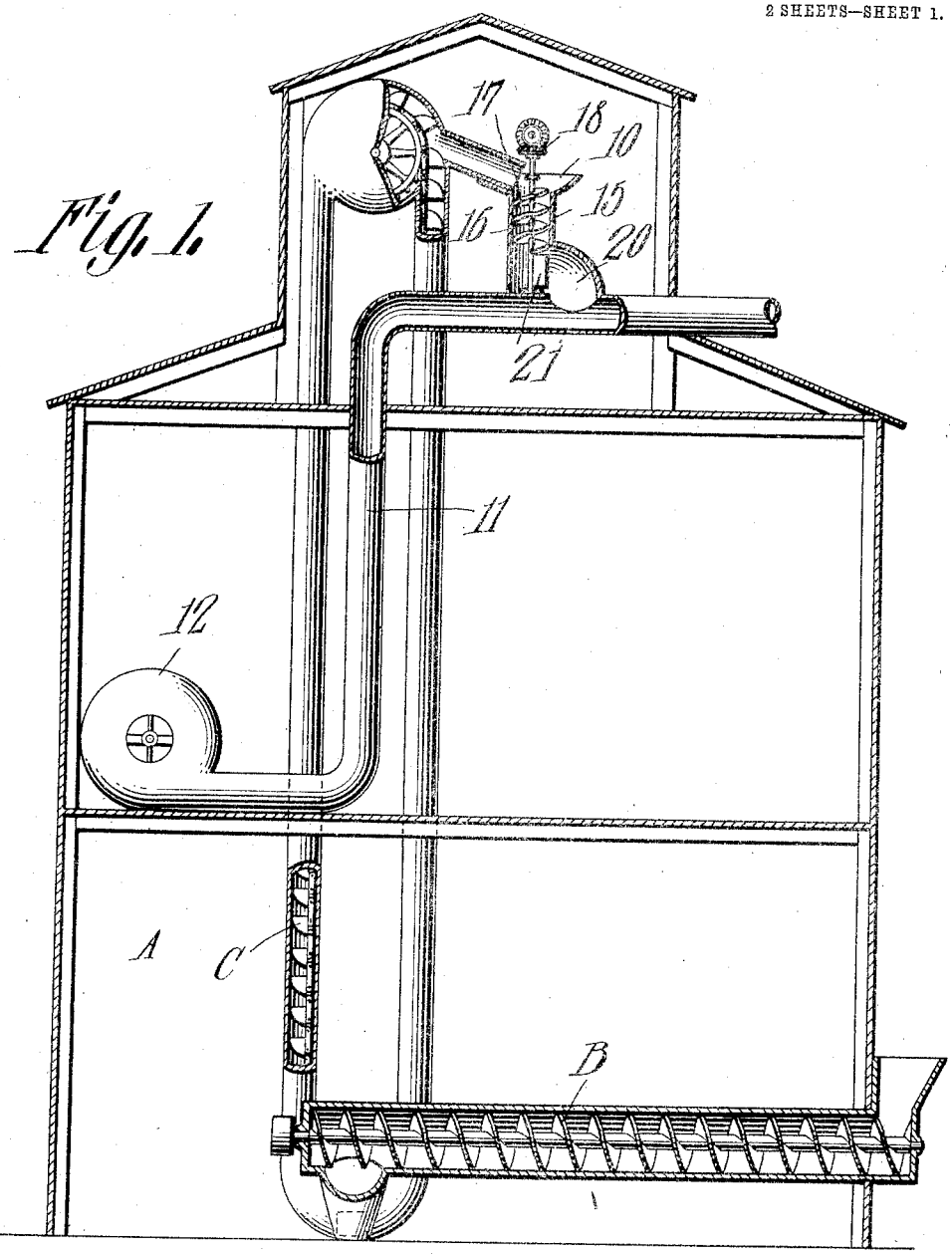

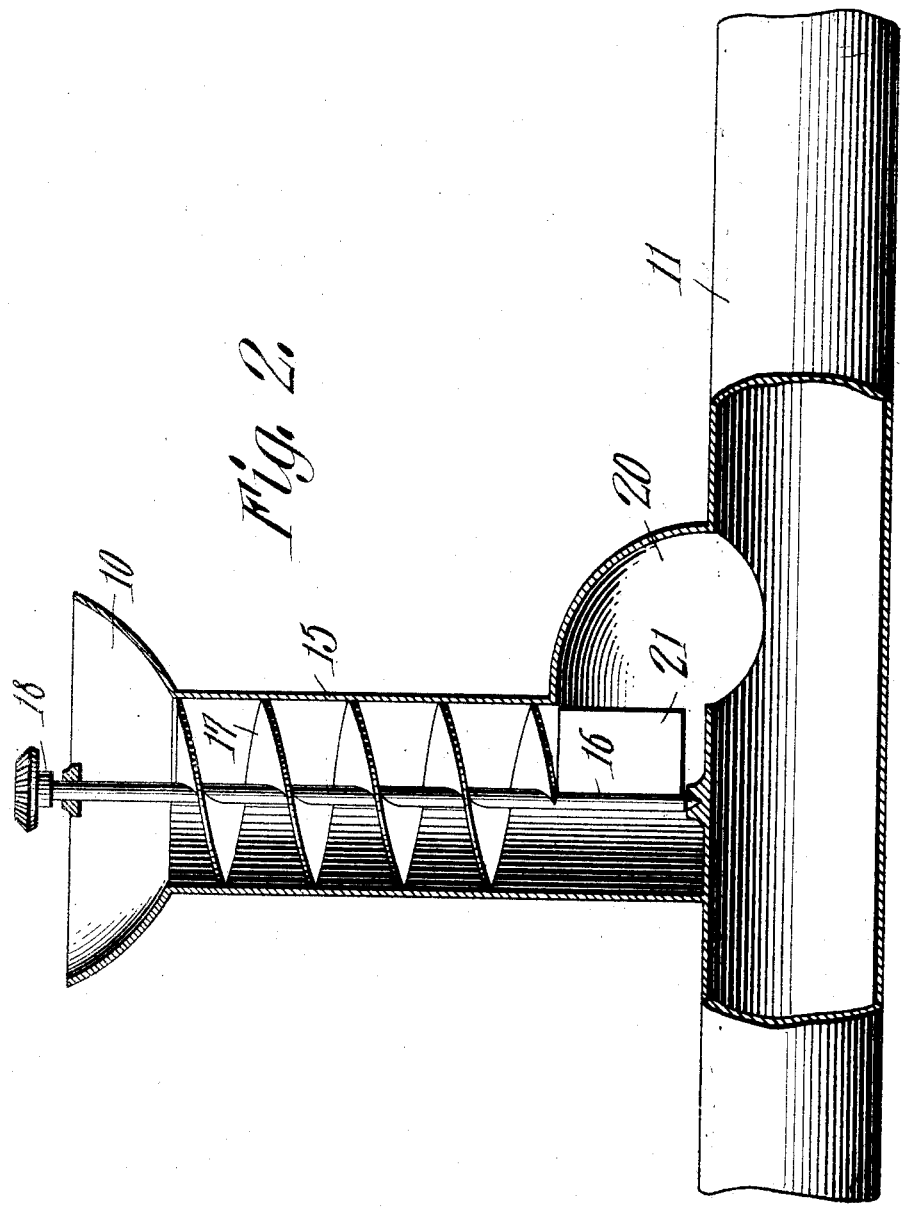

UNITED STATES PATENT OFFICE.

WILLIAM F. CARLTON, OF ADVANCE, MISSOURI.

PNEUMATIC GRAIN-CONVEYER.

No. 883,292.    Specification of Letters Patent.    Patented March 31, 1908.

Application filed September 6, 1907. Serial No. 391,660.

*To all whom it may concern:*

Be it known that I, WILLIAM F. CARLTON, a citizen of the United States, residing at Advance, in the county of Stoddard and State of Missouri, have invented a new and useful Pneumatic Grain-Conveyer, of which the following is a specification.

This invention relates to pneumatic conveyers for grain and other material, and has for its principal object to provide an improved mechanism for introducing the material to be conveyed into the pipe at a point in advance of the jet or stream of compressed air which is used as a conveying medium.

A further object of the invention is to provide an apparatus of this type in which the grain is forced into the pipe by means of a feed screw which will serve, also, as a valve to prevent blowing out of the material.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation, illustrating a grain conveying mechanism arranged in accordance with the invention. Fig. 2 is a detail sectional view on an enlarged scale of the means for feeding the material into the conveyer pipe.

Similar numerals of reference are employed to indicate corresponding parts throughout the several figures in the drawings.

The apparatus as shown in Fig. 1 is intended for use in connection with a grain elevator, and in the lower portion of the building A is a screw conveyer B by which the grain is moved toward an endless conveyer C, this conveyer carrying the grain up to and dumping it within a hopper 10 in the upper portion of the building although the general arrangement of the parts may be altered where the conveying mechanism is to be used for lifting the grain.

Arranged below the hopper is a conveyer pipe 11 one end of which is connected to a blast fan, 12, or other means for directing a blast of air through the pipe. The opposite end of the pipe communicates with the tank, car or other point where the grain or other material is to be delivered.

Mounted on the pipe is a vertically arranged casing 15, at the upper end of which is the hopper 10. This casing is preferably cylindrical in form and is provided with upper and lower bearings for the support of a vertical shaft 16 on the upper portion of which is mounted a feed screw 17, the diameter of the screw being such as to fit snugly within the cylindrical casing. At the top of the shaft is a drive pulley 18 which may receive motion from any suitable source of power.

At one side of the lower portion of the feed casing 15 is an opening that is placed in communication with the conveyer pipe by a passage 20, and the grain or other material caught by the feed screw will be forced down through the casing and through this passage 20 into the conveyer pipe in a position intersecting the path of movement of the blast of air, so that the latter will carry the material through the pipe to the point of discharge. In order to add to the efficiency of the feed screw, the lower end of the shaft 16 is provided with a feed plate 21, which acts to direct the material from the lower portion of the casing proper through the passage 20.

It will be observed that the diameter of the passage 20 and that of the casing 15 are approximately the same as the diameter of the conveyer pipe, so that the pipe may be kept well supplied with grain, and its effective area will not be reduced by the employment of injecting nozzles and similar devices, as usual.

While in operation, the cylinder 15 and the passage 20 are kept constantly filled with grain, so that it will be difficult for the air to force its way out through the casing, particularly as the feed screw is approximately equal to the internal diameter of said casing. This form of feeding means may be employed in connection with conveyer pipes arranged in any manner and employed for the carrying of material of any character.

I claim:—

In combination, a conveyer pipe, means for forcing a current of air therethrough, a feed casing, a passage connecting the lower end of the feed casing to the pipe, a shaft arranged within the casing, a forcing screw on said shaft, and a plate carried by the shaft and serving to direct the material outward from the casing through said passage.

In testimony that I claim the foregoing as my own, I have hereto affixed my signature in the presence of two witnesses.

WILLIAM F. CARLTON.

Witnesses:
    CLARENCE SCHONHOFF,
    JOHN MATHENY.